United States Patent [19]

Rahman

[11] 3,984,577

[45] Oct. 5, 1976

[54] METHOD OF COMPACTING AND FREEZE-DRYING PARTICULATE FOODS

[75] Inventor: Abdul R. Rahman, Natick, Mass.

[73] Assignee: The United States of America as represented by the Secretary of the Army, Washington, D.C.

[22] Filed: Oct. 8, 1974

[21] Appl. No.: 513,017

[52] U.S. Cl. .................... 426/385; 426/444; 426/512
[51] Int. Cl.² .................................... A23C 1/06
[58] Field of Search ........... 426/385, 444, 468, 524, 426/512

[56] References Cited
UNITED STATES PATENTS

| | | | |
|---|---|---|---|
| 3,096,163 | 7/1963 | Meryman | 426/385 |
| 3,385,715 | 5/1968 | Ishler | 426/385 |

FOREIGN PATENTS OR APPLICATIONS

| | | | |
|---|---|---|---|
| 603,970 | 10/1943 | United Kingdom | 426/385 |

OTHER PUBLICATIONS

Atlas AFD Equipment – Petersen, 159–164 in Freeze Drying of Foodstuffs, Columbia Press, 6th Ed. 1963.

*Primary Examiner*—Norman Yudkoff
*Assistant Examiner*—Hiram H. Bernstein
*Attorney, Agent, or Firm*—Nathan Edelberg; Robert P. Gibson; Charles C. Rainey

[57] ABSTRACT

A method of producing a compacted, freeze-vacuum-dehydrated food product capable of rehydration to produce discrete particulate reconstituted food of good quality comprising applying pressure to the frozen particulate food while simultaneously freeze-vacuum-dehydrating the same to a moisture content below about 4.0 weight percent.

8 Claims, No Drawings

METHOD OF COMPACTING AND FREEZE-DRYING PARTICULATE FOODS

The invention described herein may be manufactured, used, and licensed by or for the Government for governmental purposes without the payment to me of any royalty thereon.

BACKGROUND OF THE INVENTION

This invention relates to a method of simultaneously compacting and freeze-vacuum-dehydrating particulate foods, such as vegetables and meats, so that the dehydrated foods will have substantially greater bulk densities than they do when freeze-vacuum-dehydrated without compaction, and so that upon rehydration the foods will be restored to substantially the same distinct particulate states in which they existed prior to compaction and freeze-vacuum-dehydration thereof.

Freeze-vacuum-dehydration has come to be a frequently applied method of preserving food products as well as a very useful procedure for reducing the weights of foods. It is particularly useful in the production of military rations and components thereof. More recently, since the volume occupied by ration components has been found to be very important both for carrying rations and ration components on the person and for shipping them by air or otherwise, compaction of freeze-dried foods has taken on considerable importance, especially for the Armed Forces. The conventional procedure is to first freeze-vacuum-dehydrate a food and thereafter compact the dehydrated food. If the food is not readily compactible without shattering after being dehydrated, it has been found necessary to plasticize the dehydrated food by adding sufficient moisture or a moisture-mimetic agent to the food and removing the added moisture, in that case, after compaction, or in the case of foods having a fairly high sugar content, by heating the dehydrated food to a temperature sufficiently high to cause plasticization of the food by the heat-softened sugar and compacting the heated, dehydrated food. All of the above-described compaction procedures involve at least two separate steps, namely freeze-vacuum-dehydration and compaction; while in those instances where moisture is employed for plasticization, an additional step of removing the added moisture is usually required since stability of the food in storage may be adversely affected by the added plasticizing moisture, particularly if the average moisture content of the food is increased to more than four percent by weight and remains at such levels after compaction.

It is an object of the present invention to provide a method of producing a compacted freeze-vacuum-dehydrated food of less than about four percent moisture by weight efficiently and economically.

It is another object of the invention to produce a compacted, freeze-vacuum-dehydrated food from a frozen particulate food in a single step rather than in two or more separate steps, the compacted freeze-vacuum-dehydrated food being capable of being rehydrated to a particulate form substantially such as it possessed prior to freezing, compaction, and rehydration.

Other objects and advantages will become apparent from the following description of the invention.

SUMMARY OF THE INVENTION

Compaction of freeze-vacuum-dehydrated foods is accomplished by simultaneously applying pressure to frozen particulate food during freeze-vacuum-dehydration thereof under conditions which will permit moisture to escape from the food, the food being compacted to high bulk density simultaneously with freeze-vacuum-dehydration thereof. The moisture is reduced to a residual moisture content of less than about four percent by weight in the freeze-vacuum-dehydrated food, the degree of compaction thereof being to a very great extent dependent on the magnitude of the pressure applied to the frozen particulate food during freeze-vacuum-dehydration thereof.

DESCRIPTION OF THE PREFERRED EMBODIMENT

I have found it to be preferable to employ a platen temperature of from about 100° to about 150°F. and a total gas and vapor pressure in the vacuum chamber of from about 0.1 to about 2.0 mm of mercury. When these conditions prevail, I have found that the frozen food should be subjected to a mechanical pressure of at least about 20 p.s.i. in order to realize a satisfactory degree of compaction of the food by the time its moisture content is reduced to less than about 4.0 percent by weight. The upper limit of the mechanical pressure which may be applied to the food during freeze-drying thereof depends on the equipment chosen for applying pressure simultaneously with freeze-drying. However, it is preferable at least during the early stages of the freeze-drying not to apply so great a pressure that the frozen food particles will be shattered before they have an opportunity to gradually become compacted as they give up their moisture to the surrounding partial vacuum. As the dehydration progresses, the pressure may be gradually increased, if desired; but care must be exercised not to increase the pressure so rapidly as to completely destroy the integrity of the food particles upon rehydration of the compacted, freeze-vacuum-dehydrated food.

I have found that vegetables and meats (including fish as well as other edible animal products) that occur naturally in particulate form or are susceptible to subdivision into particulate forms having at least one dimension not greater than about ¾-inch are suitable for simultaneous compaction and freeze-vacuum-dehydration in accordance with the method of the invention. For example, peas and diced carrots have been found to be particularly suitable for processing in this manner. However, numerous other foods, such as cut green beans, sweet corn kernels, red beans, mushrooms, chunks of chicken, pork, veal, lamb, beef or any other meat, and many other foods may be processed to a highly compacted freeze-dehydrated form in accordance with the method of this invention. Meat is defined as an edible portion of an animal. Foods in particulate form of greater dimensions than mentioned above may be processed into compacted, freeze-dehydrated forms in accordance with the invention if time is of no great importance. Very large frozen foods or food particles, however, would involve such thicknesses of the frozen food material through which the heat of sublimation would need to be conducted and through which the moisture would need to migrate and be withdrawn under the influence of the partial vacuum, that, in general, it is preferred to subdivide large food products and freeze the resulting particles, then to freeze-dehydrate these particles while subjecting them to mechanical pressure in accordance with the invention.

In general, the compaction ratios attained in accordance with the invention will be from about 2:1 to about 16:1. However, an occasional food may contain so much moisture and be of such configuration, as in French cut beans, that the compaction ratio may be greater than 16:1. Compaction ratio is the ratio of the volume occupied by the frozen food particles prior to freeze-vacuum-dehydration and compaction to the volume occupied by the compacted freeze-vacuum-dehydrated food. Although feasible, the use of compaction ratios of less than 2:1 is generally considered not to be worth the additional cost of applying pressure during freeze-vacuum-dehydration.

The net result of the carrying out of the method of the present invention is the production of highly compacted freeze-vacuum-dehydrated vegetables or meats having bulk densities of from about 0.5 to about 1.2 grams per cc which are capable upon rehydration of being restored to particle sizes, shapes, and textures substantially identical with the same characteristics of the vegetables or meats prior to the simultaneous compaction and freeze-vacuum-dehydration thereof.

The method of the invention may be carried out in conventional freeze-vacuum-dehydration equipment for the most part, but employing as containers for the frozen food particles vessels which have perforations in the sidewalls and bottom and which have perforated covers of slightly less diameters or rectangular dimensions than the inside dimensions of the vessels so as to permit the covers to compact the food particles within the vessels when large enough weights are placed on top of the covers or sufficient mechanical pressure is applied to the covers by other means during freeze-vacuum-dehydration of the food particles. The weights placed on the covers may be varied or the application of pressure to the covers by other means may be varied to suit the particular food being compacted while being freeze-vacuum-dehydrated and so as to obtain different compaction ratios and different bulk densities as desired for the different containers of frozen particulate foods in the same or in different freeze-vacuum-dehydration areas.

Having described in general terms the conditions under which the compacted, freeze-vacuum-dehydrated food products of the present invention are prepared, I will now proceed to disclose specific examples of the production of compacted, freeze-vacuum-dehydrated foods in accordance with the above-described principles and of the use of such compacted, freeze-vacuum-dehydrated foods.

It will be understood, of course, that the above-described and other advantages of my invention may also be accomplished by suitable variation of the conditions, about to be set forth below, which are intended to be for illustrative purposes, and not for purposes of limiting the scope of my invention.

EXAMPLE 1

Simultaneous Freeze-Vacuum-Dehydration and Compaction of Peas

Individually quick frozen peas, obtained from a commercial source, were placed in a cylindrically shaped, perforated vessel having perforations uniformly spaced apart throughout its sidewalls and bottom, the perforations being approximately ⅛-inch in diameter. Enough of the frozen peas were placed in the vessel to cover an area of 1 inch$^2$ and a perforated cover having a diameter approximately ⅛-inch less than the inside diameter of the vessel was placed on top of the sample of peas within the vessel. A 26 pound weight was placed on top of the cover, providing a pressure of about 26 p.s.i. on the sample of frozen peas. The perforated vessel containing the frozen peas under the 26 p.s.i. pressure was placed on a platen inside of a freeze dryer and freeze-vacuum-dehydration of the peas was carried out at a platen temperature of about 120°F. and a total gas and vapor pressure within the freeze dryer of about 0.2 mm of mercury. After approximately 12 hours, the freeze dryer was opened and the freeze-vacuum-dehydrated peas were found to be in a compacted form. This represented a compaction ratio of about 4:1, based on the original volume of the frozen peas. The moisture content of the compacted, freeze-vacuum-dehydrated peas was found to be about 2.0 percent by weight and the bulk density thereof was found to be 0.87 gram per cc compared with a bulk density of freeze-dried peas which were not compacted while being freeze-dried of 0.22 gram per cc.

The compacted, freeze-vacuum-dehydrated peas prepared as described above were placed in a volume of boiling water approximately 10 times their own volume and boiled for about 15 minutes, then permitted to stand for about 15 minutes more in water at a temperature of about 190°F. The rehydrated peas were strained to remove excess water and found by a technological panel to be substantially as acceptable as and comparable in size and shape to rehydrated freeze-dried peas which had not been subjected to compaction and freeze-vacuum-dehydration simultaneously.

EXAMPLE 2

Simultaneous Compaction and Freeze-Vacuum-Dehydration of Diced Carrots

Fresh whole carrots were washed, scraped substantially free of skin, rinsed to remove the remnants of the scraped skin, and cut to produce dice of about ⅜-inch length on each side. The diced carrots were blanched by contacting them with water, heated to about 205°F., for 5 minutes. The blanched, diced carrots were drained free of surface water. The diced carrots were individually quick frozen in a blast freezer. The individually frozen, diced carrots were placed in a cylindrically shaped, perforated vessel having perforations uniformly spaced apart throughout its sidewalls and bottom, the perforations being approximately ⅛-inch in diameter. Enough of the frozen diced carrots to cover an area of 1.3 inch$^2$ were placed in the vessel and a perforated cover was placed on top of the sample of diced carrots within the vessel. A 26 pound weight was placed on top of the cover, providing a pressure of about 20 p.s.i. on the sample of frozen, diced carrots. The perforated vessel containing the frozen, diced carrots under the 20 p.s.i. pressure was placed on a platen inside of a freeze dryer and freeze-vacuum-dehydration of the diced carrots was carried out at a platen temperature of about 120°F. and a total gas and vapor pressure within the freeze dryer of about 0.2 mm of mercury. After approximately 12 hours, the freeze dryer was opened and the freeze-vacuum-dehydrated carrots were found to be in a compacted form. The carrots in this compacted form represented a compaction ratio of about 12.5:1, based on the original volume of the frozen, diced carrots. The compacted, freeze-dried carrots were found to have a bulk density of 0.5 gram per cc. compared with a bulk density of freeze-dried diced carrots which were not compacted while being freeze-dried of 0.04 gram per cc. The moisture content of the compacted, freeze-vacuum-dehydrated carrots was found to be about 2.0 percent by weight.

The compacted, freeze-dried carrots were rehydrated by placing one or more compacted, freeze-dried portions thereof in an excess of boiling water over that required for rehydration of the carrots, continuing to boil the water for 15 minutes, then allowing the carrots to stand and simmer for 15 minutes more in water at a temperature of about 190°F. The rehydrated diced carrots were strained to remove excess water and found to be quite acceptable and to be closely comparable in shape and size to the original diced carrots prior to freezing thereof and subsequent compaction while simultaneously freeze-vacuum-dehydrating the frozen, diced carrots.

EXAMPLE 3

Simultaneous Freeze-Vacuum-Dehydration and Compaction of Green Beans

Fresh green beans were washed, drained free of surface water, and cut into segments ½–1 inches long. The cut green beans were blanched by contacting them with water, heated to about 205°F., for 5 minutes. The blanched, cut green beans were drained free of surface water and then were frozen in a blast freezer. The frozen cut green beans were placed in a cylindrically shaped, perforated vessel having perforations uniformly spaced apart throughout its sidewalls and bottom, the perforations being approximately ⅛-inch in diameter. Enough of the frozen cut green beans to cover an area 0.5 inch$^2$ were placed in the vessel and a perforated cover having a diameter approximately ⅛-inch less than the inside diameter of the vessel was placed on top of the sample of cut green beans within the vessel. A 26 pound weight was placed on top of the cover, providing a pressure of about 52 p.s.i. on the sample of frozen, cut green beans. The perforated vessel containing the frozen, cut green beans under the 52 p.s.i. pressure was placed on a platen inside of a freeze dryer and freeze-vacuum-dehydration of the cut green beans was carried out at a platen temperature of about 120°F. and a total gas and vapor pressure within the freeze dryer of about 0.2 mm of mercury. After approximately 12 hours, the freeze dryer was opened and the freeze-vacuum-dehydrated green beans were found to be in the form of compacted green beans with a bulk density of 0.56 gram per cc. This represented a compaction ratio of about 14.0:1 in comparison with cut green beans which were not compacted while being freeze-dried and which had a bulk density of 0.04 gram per cc. The moisture content of the compacted, freeze-vacuum-dehydrated cut green beans was found to be about 2.0 percent by weight.

The compacted, freeze-dried green beans were rehydrated by placing them in an excess of boiling water over that required for rehydration of the green beans, continuing to boil the water for 15 minutes, then allowing the green beans to stand and simmer for 15 minutes more in water at a temperature of about 190°F. The rehydrated cut green beans were strained to remove excess water and found to be quite acceptable and to be closely comparable in shape and size to the original cut green beans after being cooked in boiling water for 15 minutes and being allowed to stand and simmer for 15 minutes more in water at a temperature of about 190°F., and then being strained to remove excess water therefrom.

EXAMPLE 4

Simultaneous Compaction and Freeze-Vacuum-Dehydration of Diced Beef

Longissimus dorsi muscles of beef were frozen, then sawed to form cubes ½-inch in length on each side and maintained frozen. The diced beef was placed in a cylindrically shaped, perforated vessel such as that described in Example 1 and a 26 pound weight was placed on top of the perforated cover, providing a pressure of about 25 p.s.i. on the sample of frozen, diced beef. The perforated vessel containing the frozen, diced beef under the 25 p.s.i. pressure was placed on a platen inside of a freeze dryer and freeze-vacuum-dehydration of the diced beef was carried out at a platen temperature of about 120°F. and a total gas and vapor pressure within the freeze dryer of about 0.2 mm of mercury. After approximately 16 hours, the freeze dryer was opened and the freeze-vacuum-dehydrated beef was found to be in a compacted form. This compacted form of the beef represented a compaction ratio of about 3.0:1, based on the original volume of the frozen, diced beef. The compacted, freeze-dried beef was found to have a bulk density of 1.2 grams per cc compared with a bulk density of freeze-dried beef which was not compacted while being freeze-dried of 0.4 gram per cc. The moisture content of the compacted, freeze-vacuum-dehydrated beef was found to be about 2.0 percent by weight.

The compacted, freeze-dried beef was rehydrated in a similar manner to that described in Examples 3 and 4.

While the invention has been described above in terms of the application of the process to such foods as peas substantially in their natural form and to carrots, beans, and beef cut into dice or other suitable subdivisions of the forms in which they occur naturally, it is to be understood that it may be applied to foods which have been converted from their natural forms into other particulate forms. In general, the invention works best with vegetables which comprise a skin covering the fleshy inner portions of the food, such as peas, or with relatively fibrous foods, such as meats, since these types of foods exist in or are convertible to particulate forms which, though distorted during the compaction and freeze-vacuum-dehydration thereof, are capable of being restored to substantially their original particulate shapes and sizes upon rehydration.

The present invention has the advantage over the prior art methods of producing compacted, freeze-vacuum-dehydrated foods which, upon rehydration with water, produce discrete particulate rehydrated foods, in that the compaction is combined with the dehydration and, further, that no addition of moisture is required for compaction and, therefore, no second dehydration is required to remove moisture added to facilitate compaction. This results in a lower processing cost and savings in time and amount of handling of the food required.

I wish it to be understood that I do not desire to be limited to the exact details described, for obvious modifications will occur to a person skilled in the art.

I claim:

1. A method of producing a compacted, freeze-vacuum-dehydrated food selected from the group consisting of vegetables and meats which upon rehydration with water produces a discrete particulate rehydrated food which is substantially indistinguishable from the food prior to compaction and freeze-vacuum-dehydration thereof, which comprises compacting said food while frozen in particulate form and simultaneously freeze-vacuum-dehydrating said food to a moisutre content below about 4.0 percent by weight, said compacting being carried out by applying mechanical pressures of at least about 20 p.s.i. and sufficient to provide a freeze-vacuum-dehydrated food having a bulk density of from about 0.5 to about 1.2 grams per cc.

2. A method according to claim 1, wherein said freeze-vacuum-dehydration is carried out using a platen temperature of from about 100° to about 150°F. and a total gas and vapor pressure of from about 0.1 to about 2.0 mm of mercury.

3. A method according to claim 1, wherein said food is a vegetable.

4. A method according to claim 3, wherein said vegetable is peas.

5. A method according to claim 3, wherein said vegetable is cut green beans.

6. A method according to claim 3, wherein said vegetable is diced carrots.

7. A method according to claim 1, wherein said food is a meat.

8. A method according to claim 7, wherein said meat is diced beef.

* * * * *